United States Patent [19]

Wenzel et al.

[11] 4,241,203

[45] Dec. 23, 1980

[54] ACRYLONITRILE COPOLYMERS HAVING LOW RESIDUAL MONOMER CONTENT AND METHODS FOR THEIR PREPARATION

[75] Inventors: Franz Wenzel, Darmstadt; Heinz-Dieter Bruemmer, Seeheim, Jugenheim, Fed. Rep. of Germany; Manfred Krieg, Darmstadt-Neu-Kranichstein, all of Fed. Rep. of Germany

[73] Assignee: Röhm GmbH, Darmstadt, Fed. Rep. of Germany

[21] Appl. No.: 6,210

[22] Filed: Jan. 24, 1979

[30] Foreign Application Priority Data

Feb. 3, 1978 [DE] Fed. Rep. of Germany ....... 2804533

[51] Int. Cl.³ .................... C08F 220/14; C08F 220/44
[52] U.S. Cl. ...................................... 526/218; 128/68; 428/220; 526/73; 526/228; 526/323.2; 526/329.3; 526/342; 528/503
[58] Field of Search ..................... 526/329.3, 218, 341, 526/342, 228, 73; 528/503

[56] References Cited

U.S. PATENT DOCUMENTS

| | | |
|---|---|---|
| 2,656,334 | 10/1953 | D'Alelio . |
| 2,974,125 | 3/1961 | Lang et al. ......................... 526/329.3 |
| 3,252,950 | 5/1966 | Terenzi et al. .................... 526/329.3 |
| 3,847,885 | 11/1974 | Peeso .................................... 528/503 |

FOREIGN PATENT DOCUMENTS 1083549 6/1960 Fed. Rep. of Germany .
738473 10/1955 United Kingdom .

Primary Examiner—Harry Wong, Jr.
Attorney, Agent, or Firm—Curtis, Morris & Safford

[57] ABSTRACT

What is disclosed are copolymers predominantly containing acrylonitrile and having a very low residual monomer content, for example of less than 100 ppm, the method of making such copolymers by polymerization to at least 60 percent conversion followed by post-heating at a temperature of more than 130° C., and the use of such copolymers in orthopedic devices which come into direct contact with the skin.

3 Claims, No Drawings

ACRYLONITRILE COPOLYMERS HAVING LOW RESIDUAL MONOMER CONTENT AND METHODS FOR THEIR PREPARATION

The present invention relates to copolymers of acrylonitrile which have a low content of, or possibily are free of, residual monomer and to a method for their production. The invention also relates to the use of the polymers for the production or orthopedic molded articles.

It is known that the mechanical and thermal properties of polymers of vinyl monomers are detectibly impaired if the monomeric starting materials of the polymer are not completely converted during preparation of the polymer or are produced again by a subsequent degradation of the polymer. Various methods are known for eliminating residual monomers in a polymer. As a rule, it is attempted to polymerize them under the action of radicals at high temperatures. Such a polymerization can take place only above the softening point of the polymer, since otherwise the rate of diffusion of the monomers will be too low. However, the use of high temperatures has the disadvantage that thereby the equilibrium temperature of polymerization and depolymerization, the so-called "ceiling temperature", is approached. The percentage of monomers which remains unpolymerized therefore increases again with an increase in the temperature, even if polymerization-producing radicals are available and the diffusion of the monomers in the polymer is unimpeded. Thus, in principle, the residual monomer content can not be reduced as low as desired by post-polymerization processes at high temperature.

One method of producing polystyrene which is low in residual monomer is known in the prior art from U.S. Pat. No. 2,656,334. In accordance with this process, the residual monomer content, which is within the range of 0.4 to 1% by weight if no special measures are employed, is reduced to 0.01 to 0.1% by weight by using two different radical-forming initiators for the polymerization of the styrene. One of these, namely benzoyl peroxide, is active during the actual polymerization within the range of 25° to 95° C. while the other, namely tert. butyl peroxybutane, is active during a subsequent post-heating to 100° to 150° C. By the reduction of the residual monomer content by at least one order of magnitude, a substantial improvement in the mechanical and thermal properties is obtained, even though the injurious influence of the monomers is still not entirely eliminated.

This process of residual monomer polymerization cannot be applied directly to the production of copolymers of acrylonitrile. This can be noted from U.S. Pat. No. 2,656,341, which was applied for by the same inventor on the same day as the aforementioned patent relating to styrene. Whereas in the case of the production of polystyrene the reduction of the residual monomer content is specifically set forth in figures, reference is merely made to "improvements" when the analogous process is used for the polymerization of acrylonitrile. The temperature of the post-polymerization cannot be chosen as high for the preparation of polystyrene, but is limited to the range from 85° to 125° C. As a radical-former, tert. butyl perbenzoate or tert. butyl perphthalate can also be used in addition to the above-mentioned tert. butyl peroxybutane.

Polymerization experiments with a mixture of 70 parts of acrylonitrile and 30 parts of methyl methacrylate gave a copolymer having a residual monomer content of 0.4 to 1%. This lies within the range which is reached, for instance, also upon the production of polystyrene. By post-heating for four hours at 110° C., 120° C., or 130° C., the residual monomer content was reduced only to about 0.2 to 0.3%, which is not sufficient to avoid the disadvantages caused by the residual monomers.

This result could reasonably be interpreted by the stepwise approach to the ceiling temperature which for most monomers lies above 200° C. Thus further reduction in the residual monomer content by an increase in the post-polymerization temperature to above 130° C. was all the less to be expected since, in the aforementioned prior art, lower temperatures were expressly stipulated for the post-polymerization of acrylonitrile than for the post-polymerization of styrene. The object of the invention was to reduce the residual monomer content of copolymers containing acrylonitrile to such an extent that it no longer has a detrimental effect on the mechanical and thermal properties of the polymer. With a reduction of the residual monomer content to less than 100 ppm, these disadvantages are substantially excluded and they are practically no longer noticeable at all at less than 50 ppm. Since acrylonitrile, even in very small quantities, is considered injurious to the health, an even further reduction of the acrylonitrile content to less than 10 ppm, and preferably to below the limit of detection, which lies at 1 to 2 ppm, is desirable.

Surprisingly, if a temperature of 130° C. is exceeded during the post-polymerization of acrylonitrile-containing polymers, the residual monomer concentration drops drastically. Already at 140° C., residual monomer contents of less than 0.005% (50 ppm) are found. At the same time, a dark discoloration of the polymer can be noted, which indicates that reactions other than a polymerization of vinyl groups are taking place. For example, a polymerization of nitrile groups may commence. The invention, however, is not limited to any specific theory as to the chemical processes which take place upon the conversion of the residual monomers.

The problem posed is solved according to the present invention by exceeding a temperature of 130° C. during the post-heating of the copolymer which has been obtained—after at least 60% conversion—from a monomer mixture which consists predominantly of acrylonitrile. At temperatures lying closely above 130° C., the conversion of the residual monomers still takes place relatively slowly, so that heating times of more than four hours may be necessary in order to arrive at less than 100 ppm residual monomer. At the preferred temperatures of 140° C. to 170° C., residual monomer values approaching the limit of detection are obtained within 4 to 12 hours.

The effect of the reduced content of residual monomer on the mechanical and thermal properties of the copolymers of the invention can be shown by comparing them with a heretofore commercially-available copolymer containing 70% by weight of acrylonitrile and 30% by weight of methyl methacrylate:

| | Copolymer of 70% by Weight of Acrylonitrile and 30% by Weight of Methyl Methacrylate | |
|---|---|---|
| Post-heating | 4 hours at 100° C. | 8 hours at 140° C. |

-continued

| | Copolymer of 70% by Weight of Acrylonitrile and 30% by Weight of Methyl Methacrylate | |
|---|---|---|
| Vicat softening point (DIN 53 460) | 80° C. | 95° C. |
| Tensile strength (DIN 53 455) | 90 N/mm$^2$ | 100 N/mm$^2$ |
| Bending strength (DIN 53 452) | 160 N/mm$^2$ | 180 N/mm$^2$ |
| Impact strength (DIN 53 453) | 40 kJ/m$^2$ | 50 kJ/m$^2$ |

The preferred embodiment of the invention consists of copolymers of 60 to 80 percent by weight of acrylonitrile and 40 to 20 percent by weight of methyl methacrylate, having a content of monomeric acrylonitrile of less than 100 ppm and preferably less than 10 ppm. In addition to acrylonitrile and methyl methacrylate, smaller amounts of other radically-polymerizable monomers may be present in the structure of the polymers, for instance monomers having a plurality of polymerizable double bonds. These preferred polymers are prepared in the form of plates having a thickness from 1 to 10 mm and because of their advantageous mechanical properties are suitable for the production of orthopedic molded articles, such as shoe soles and prostheses.

The preferred polymers are produced by bulk polymerization, preferably in the presence of at least two radical-forming initiators, one of which has a low decomposition point and a half-life of one hour at 60° to 100° C., while the second has a high decomposition temperature and a half-life of one hour at 100° to 140° C. As initiators of the last-mentioned type, having a high decomposition point, tertiary butyl perbenzoate, tertiary butyl-per-3,5,5-trimethylhexanoate, 2,2-bis-(tert.-butyl peroxy)-butane, or dicumylperoxide are particularly suitable. The initiators having a high decomposition point strengthen the effect of the elevated post-heating temperature and permit reaching acrylonitrile contents close to or below the limit of detection. The ratio by weight of initiators of low decomposition point to initiators of high decomposition point can, for instance, be between 10:1 and 1:1.

However, the invention is not limited to these copolymers which are particularly suitable for orthopedic purposes, but can be employed in general for the production of polymers from monomer mixtures containing 51 to 90 percent by weight of acrylonitrile and 49 to 10 percent by weight of one or more other radical-polymerizable monomers. The free-radical polymerization of these monomer mixtures takes place in known manner at temperatures of less than 100° C. under the influence of 0.01 to 1% by weight of radical-forming initiators of the low-decomposition-temperature type such as dibenzoyl peroxide, dilauryl peroxide, azo-bis-isobutyronitrile, or tert.-butyl perpivalate, or of the aforesaid mixtures of initiators of low and high decomposition point. In addition to acrylonitrile, for instance the alkyl esters of acrylic or methacrylic acid having 1 to 6 carbon atoms in the alkyl radical, or styrenes, which may possibly be alkyl-substituted, such as vinyl toluene or alpha-methylstyrene, can be used as tcomonomers. The bulk polymerization of the monomer mixtures under the conditions indicated, or possibly by bead polymerization in aqueous phase, at temperatures below 100° C. leads to at least a 75% conversion of the monomers used. The time of polymerization depends greatly on the process conditions, for instance the removal of heat or the layer thickness, and as a rule is several hours. In addition to this, there is the post-treatment according to the invention at temperatures above 130° C.

Because of their reddish-brown to dark-brown color, the products of the invention are primarily suitable for those purposes in which good mechanical and thermal properties and low acrylonitrile content are more important than light color and transparency. Their use in the field of orthopedics has already been mentioned. As addition fields of use, mention may be made of housings and coverings for machines and other technical apparatus where the combination of low weight and high toughness of the material is advantageous.

A better understanding of the present invention and of its many advantages will be had by referring to the following specific examples, given by way of illustration.

EXAMPLE 1

A mixture of 70 parts of acrylonitrile, 30 parts of methyl methacrylate, 0.3 parts of ethylene glycol dimethacrylate, and 0.1 part of dibenzoyl peroxide was introduced into a chamber consisting of two glass plates with elastic sealing cord between them, and polymerized in a water bath for 24 hours at 45° C. Thereupon curing was effected for 8 hours at 140° C. The thickness of the plate was 4 mm.

The Vicat softening point was 101° C. and the residual monomer content 0.004%.

COMPARATIVE EXPERIMENT FOR EXAMPLE 1

A plate was polymerized in accordance with Example 1. However, instead of being cured at 140° C., it was cured for 8 hours at only 120° C.

The Vicat softening point was 96° C. and the residual monomer content 0.3%.

EXAMPLE 2

A plate was polymerized in a manner similar to Example 1 from a mixture of 75 parts of acrylonitrile, 5 parts of styrene, 20 parts of methyl methacrylate, 0.3 part of ethylene glycol dimethacrylate, 0.1 part of dibenzoyl peroxide and 0.05 part of tert.-butyl perbenzoate and cured for 8 hours at 140° C.

The Vicat softening point was 100° C., and the residual monomer content 0.0001%.

What is claimed is:

1. The method of making a copolymer of acrylonitrile having a residual monomer content of less than 50 ppm, which comprises free-radically bulk polymerizing a monomer mixture of 60 to 80 percent by weight of acrylonitrile and 40 to 20 percent by weight of methyl methacrylate to effect a conversion of at least 75 percent by weight thereof and then further heating the resulting polymer-monomer mixture to a residual monomer content of less than 50 ppm by post-heating for 4 to 12 hours at 140° C. to 170° C.

2. A method as in claim 1 wherein said monomer mixture is free-radically polymerized in the presence of at least two radical-forming initiators, one of which has a half-life of one hour at temperatures of 60° to 100° C. and a second has a half-life of one hour at temperatures of 100° to 140° C.

3. A method as in claim 2 wherein said initiator having a half-life of one hour at 100° C. to 140° C. is tert. butyl perbenzoate, tert. butyl - per-3,5,5-trimethylhexanoate, 2,2-bis-(tert. butylperoxy) butane, or dicumylperoxide.

* * * * *